United States Patent [19]
[11] 3,939,095
Sliwka et al.
[45] Feb. 17, 1976

[54] DYE-CONTAINING MICROCAPSULES

[75] Inventors: Wolfgang Sliwka, Weinheim; Wolf-Ruediger Gaefke; Tilmann Korth, both of Ludwigshafen, all of Germany

[73] Assignee: Badische Anilin- & Soda-Fabrik Aktiengesellschaft, Ludwigshafen (Rhine), Germany

[22] Filed: Aug. 8, 1973

[21] Appl. No.: 386,526

[30] Foreign Application Priority Data

Aug. 10, 1972 Germany ............................ 2239358

[52] U.S. Cl. .................... 252/316; 8/94 R; 252/364; 428/307

[51] Int. Cl.[2] ........................................... B01J 13/02

[58] Field of Search .......... 252/316; 8/94; 117/36.2, 117/100 A; 260/666 PY; 428/307

[56] References Cited

UNITED STATES PATENTS

| | | | |
|---|---|---|---|
| 3,016,308 | 1/1962 | Macaulay | 252/316 X |
| 3,636,176 | 1/1972 | Hall | 260/666 PY |
| 3,677,813 | 7/1972 | Eckert et al. | 117/161 UT X |
| 3,836,383 | 9/1974 | Kiritani et al. | 252/316 X |

*Primary Examiner*—Richard D. Lovering
*Attorney, Agent, or Firm*—Johnston, Keil, Thompson & Shurtleff

[57] ABSTRACT

Microcapsules, particularly for the use in the manufacture of "no carbon required" copying material, which microcapsules contain as core material not only dye precursors but also mono- or poly-alkyl-substituted indans.

6 Claims, No Drawings

DYE-CONTAINING MICROCAPSULES

This invention relates to microcapsules containing alkyl-substituted indans and dyes as core materials.

It is known to use microcapsules containing dyes for making copying papers, the microcapsules generally being ruptured by the pressure applied during a writing operation so that the liberated dye is transferred to an acid-reacting layer where, if a leuco compound has been used, the actual dye is developed.

In the formation of the dye on the acid-reacting layer, a developer is required, since the dyes are generally only capable of being adsorbed on the acid-reacting layer when in solution.

The developers described for the dyes, which are at the same time solvents for the dyes and core materials for the microcapsules, are for example hydrocarbons such as naphthas, xylenes, diphenyls and/or chlorinated compounds. At the present time, mixture of chlorinated hydrocarbons, particularly mixtures of chlorinated diphenyls are almost exclusively used. However, these chlorinated compounds have a number of drawbacks. On account of its high density, the microcapsule dispersion shows a relatively strong tendency to sedimentation with the formation of agglomerates, this greatly hampering the handling of the capsule dispersion in storage, metering, or in the further processing thereof to form a paper coating composition.

The chlorinated diphenyls also have the drawback that in their presence dye development takes place comparatively slowly. It is also known that chlorinated diphenyls, in particular, show a certain degree of toxicity, cannot be degraded chemically or microbiologically and tend to accumulate in certain organs of living creatures. Complete destruction of residues is only possible by incineration, which produces undesirable hydrogen chloride gas. When the papers are re-used as salvage paper, there is the risk of these materials passing into foodstuffs via packaging materials. They also have an unpleasant odor.

Thus there is a need for novel solvents or developers for use as core materials in dye-containing microcapsules.

We have found that microcapsules containing as core material a water-immiscible liquid and at least one dye, the water-immiscible liquid substantially consisting of one or more mono- or poly-alkyl-substituted indans in which the alkyl side-chains are linear or branched and may contain from 1 to 11 carbon atoms do not suffer from the above drawbacks.

Alkyl-substituted indans have desirable properties for use as solvents or developers for reactive dyes. They have relatively high boiling points and, particularly in mixtures, very low solidification points of below −15°C. They have low viscosity over a wide temperature range and permit good transfer of the dye to the acid-reacting layer. Full development of the dye is possible even when the acid-reacting layer is merely moistened by the solvent, since the non-polarity of the alkyl-substituted indans does not impair the adsorption and reaction of the dye on the said pigments of the acid-reacting layer.

Examples of suitable indans having alkyl side chains of from 1 to 11 carbon atoms are 1-(1′,6′-dimethylheptyl)indane, 1-isopropylindan, 1,1-dimethylindan, 4-t-butylindan and 2-ethylindan.

The preferred indan compounds are phenyl-substituted indans having linear or branched alkyl side-chains preferably of from 1 to 6 carbon atoms. These are, in particular, alkyl-substituted 3-phenylindans and mixtures of alkyl-substituted phenylindans or mixtures thereof with other solvents or developers.

It is surprising that in a 6 percent w/w mixture of a conventionally used reactive dye mixture, for example a mixture of Crystal Violet lactone and N-benzoylleuco Methylene Blue in a ratio of about 3:1, the dye precursors are contained in a dissolved state to an extent of only 5.28 percent by weight in 1-methyl-3-phenylindan, of only 3.05 percent by weight in 1-methyl-3-phenyl-5-isopropylindan and of only 2.48 percent by weight in 1-methyl-3- [p-isopropylphenyl]-5-isopropylindan and yet produce copies having the same color intensity as given by a 6 percent w/w solution of said dye precursor mixture in chlorinated diphenyl. This fact shows that even undissolved dye precursor is assisted in development by said solvent in the copying operation. In the art there has been the prejudice that only those solvents showing very high solubility for the dye precursors and thus ensuring complete solution of the latter are capable of guaranteeing good dye development.

Another advantage of alkyl-substituted phenyl indans over dichlorodiphenyl is that they have virtually no solvent or plasticizing effect on the polymeric capsule wall materials generally used, the result being that in some cases leakage through the capsule walls is less despite the lower boiling points. This means, for example, that copying papers may be manufactured which show better storage stability. The alkyl-substituted indans used are also virtually non-toxic and, surprisingly, have only a very weak odor in comparison with chlorinated diphenyl. Thus they are less of an environmental problem than liquid developers hitherto used. Another advantage of these solvents is that their density is only slightly above 1. For example 1-methyl-3-phenylindan has a density of 1.023. This means that aqueous capsule dispersions are virtually intrinsically stable with the result that they are simpler to store and easier to process. The solvents are also good solvents for conventional UV absorbers such as Tinuvin P, so that light stabilization of the encapsulated dye precursors is readily possible.

The phenyl indans are cheaply available in a technically advantageous manner from styrene as starting material. They are reaction products of styrene with itself (dimerization) or with appropriate alkyl-substituted styrene compounds and may be obtained by Friedel-Crafts alkylation processes.

It is not necessary to use the indans proposed by the invention as pure compounds. It is equally possible to use mixtures which are produced, for example, by the synthesis of these compounds on an industrial scale. The mixtures may even show an advantage over the pure substances by having lower solidification points.

Suitable alkyl radicals on the preferred phenylindans are for example methyl, ethyl, propyl and butyl to hexyl radicals, these radicals being straight-chain or branched-chain. The alkyl radicals may be attached to the indan ring system or to the phenyl radical, which is preferably in position 30 Convenient compounds are those having from 1 to 3 alkyl radicals in positions 1, 3 and 5 of the indan.

As examples of the phenyl indans which may be used in the present invention there may be mentioned: 1-methyl-3-phenylindan, 1-methyl-3-phenyl-5-isopropylindan, 1-methyl-3-phenyl-5-t-butylindan, 1-methyl-3-[p-isopropylphenyl]-5-isopropylindan, 1-ethyl-2-methyl-3-phenylindan, x-α-phenylethylindan (where x may be 1, 2, 4 or 5), 1-ethyl-2-phenyl-3-methylindan, x-phenylindan (where x may be 1, 2, 4 or 5), 1,5-dimethyl-3-[p-tolyl] indan, 1-phenyl-2-methylindan, 1-p-tolylindan, 1-methyl-2-phenylindan and 1,1-3-trimethyl-3-phenylindan.

Of these, the preferred phenylindans are 1-methyl-3-phenylindan and 1-methyl-3-phenyl-5-isopropylindan.

The choice of indan derivatives to be used in the invention is governed by their properties as solvents or developers for the reactive dye used and by their physical properties, particularly their solidification point. Usually, the solidification points of the mixtures used should not be higher than −15°C.

It will be appreciated that the alkyl-substituted indans may also be used in admixture with up to 50 percent of other solvents known to be suitable as solvents for reactive dyes, such as alkylbenzenes, diphenylbenzenes, alkylnaphthalenes, dialkylphthalates, dicyclohexylbenzenes, chloroparaffins, chlorodiphenyls and unsubstituted or substituted tetralines.

A great advantage of the alkyl-substituted indans is that they may, if desired, be used in the quality obtained from commercial synthesis. Not even the byproducts produced from the indans under the reaction conditions by dimerization or polymerization have any undesirable effect, so that there is no need to separate these compounds.

As examples of mixtures with other solvents there may be mentioned mixtures of 1-methyl-3-phenylindan with n-dodecylbenzene or of 1-methyl-3-[p-isopropylphenyl]-5-isopropylindan with dioctylphthalate. It is also possible to use blends with aliphatic hydrocarbons such as high-boiling naphthas and polynuclear aromatics or aromatic mixtures which may, if desired, be alkylated.

In a particularly preferred embodiment, the indans proposed by the present invention are used in admixture with alkyl-substituted diphenylmethanes such as are described, for example, in German Published Application No. 2,153,634. The diphenylmethanes are usually substituted with straight-chain or branched-chain alkyl groups of from 1 to 6 carbon atoms in the same manner as the phenylindans. Such alkyl-substituted diphenylmethanes may be obtained, for example, by reaction of styrene with benzene or appropriate alkyl-substituted benzenes under Friedel-Crafts conditions.

Preferred and highly suitable diphenylmethanes are: 1,1-diphenylethane (methyl diphenylmethane), methylphenyl-[3-isopropylphenyl]methane, methyl-[4,4′-diisopropyl]-diphenylmethane, methyl-[2,5,4′-triisopropyl]-diphenylmethane, methylphenyl-[2,5-diisopropylphenyl]-methane, methylphenyl-[2,5-dimethylpheny]-methane, methylphenyl-[2,5-t-butylphenyl]-methane, methylphenyl-[4-hexylphenyl]-methane and 1-phenyl-1-p-tolylethane.

Examples of advantageous mixtures are mixtures of 1-methyl-3-phenyl-5-isopropylindan with methylphenyl-[2,5-dimethylphenyl]-methane or of 1-methyl-3-phenylindan with methylphenyl-[2,5-dimethylphenyl]-methane or of 1,5-dimethyl-3-[p-tolyl]-indan with 1-phenyl-1-[3-isopropylphenyl]-methane or of 1-methyl-3-[p-isopropylphenyl]-5-isopropylindan with 1-phenyl-1-p-tolyl-ethane.

Suitable dyes are those which are soluble in the solvents or solvent mixtures generally to an extent of at least 0.1 percent by weight. In particular, they are the conventional reactive dyes known to be suitable for copying papers, for example Crystal Violet lactone, N-benzoylleuco Methylene Blue, 3-methyl-bis-naphthospiropyran, Malachite Green lactone, Rhodamin B lactone, o-hydroxybenzalacetophenone and fluorans. Such dyes and their use in copying papers are described for example in German Patent No. 671,604, German Published Application No. 1,183,918, U.S. Pat. Nos. 3,293,060; 3,179,600; 2,505,470; 2,505,472 and 2,505,480 or for example in Japanese Pat. Application No. 25,657/1970.

The microcapsules containing dyes and the phenylindans or mixtures as proposed by the invention as core materials may be made by a variety of processes and with a variety of wall materials such as are known in the prior art. For example, the microcapsules may be made by complex coacervation as described in German Published Application No. 1,122,495 or by interfacial polymerization as described in German Published Application No. 1,444,415 or with urea/formaldehyde condensation products as described in German Published Application No. 1,290,799. German Published Application No. 1,294,932 described an atomizing process for the manufacture of microcapsules, German Published Application No. 1,619,808 discloses a process for gelling emulsion droplets and German Published Application No. 1,912,323 describes a phase-reversal process.

In a preferred process for the manufacture of microcapsules, a mixture containing the wall material, the reactive dye and the alkylated phenylindan in a volatile organic solvent is dispersed in an aqueous carrier liquid where the capsule wall material migrates to the phase interfaces and is obtained in a solvent-free form by evaporation of the solvent. The capsule wall may, if desired, be further strengthened by crosslinking.

A preferred wall material for this process is a copolymer, obtained by solution polymerization, of from 20 to 65 percent by weight of methyl methacrylate, from 10 to 65 percent by weight of acetyl acetate of mono(-meth)acrylates of aliphatic diols of from 2 to 8 carbon atoms such as butanediol-1-acrylate-4-acetyl acetate, from 0 to 30% by weight of acrylamide, from 0 to 30 percent by weight of acrylic and/or methacrylic acids, from 0 to 30 percent by weight of vinyl pyrrolidone, from 0 to 30, preferably 0 to 3, percent by weight of vinylsulfonic acid or salts thereof, from 0 to 30, preferably 0 to 3, percent by weight of 2-sulfo-ethylmethyl acrylate or salts thereof and from 0 to 3 percent by weight of 2-acrylamido-2-methylpropanesulfonic acid or salts thereof, usually having a K value of from 10 to 70 as measured by the method proposed by H. Fikentscher in Cellolosechemie 13 (1932) pp. 58 et seq. Suitable salts of the said sulfonic acids are the sodium salts.

Suitable volatile solvents for the wall and core materials in this process are aliphatic chlorinated hydrocarbons such as chloroform or methylene chloride to which a lower aliphatic alcohol such as methanol, ethanol, propanol or isopropanol has been added.

In other manufacturing processes, advantageous wall materials are for example gelatine, polyvinyl alcohol, urea/melamine or phenyl/formaldehyde resins, polyamides and polyurethanes.

In the manufacture of copying papers, the resulting microcapsules are usually applied, in the form of a microcapsule dispersion, to a substrate such as paper or plastics films. Alternatively, they may be embedded in, for example, the body of the paper or in similar compositions consisting of other polymers. Due to their excellent non-leak properties, they may also be applied directly to the conventional acid-reacting layers. Suitable acid-reacting layers are for example kaolin, attapulgite, bentonite, acidic colloidal silicon dioxide, zeolite and organic acid resins such as phenolic resins.

In the following Examples the parts are by weight.

EXAMPLE 1

Preparation of copolymers for the wall material

In a stirred vessel equipped with a temperature bath 500 parts of a mixture of 478 parts of butanediol monoacrylate acetyl acetate, 380 parts of methyl methacrylate, 140 parts of acrylamide and 2 parts of the sodium salt of 2-sulfoethyl methacrylate, which mixture has been previously neutralized to pH 4 with 10% caustic soda solution, is mixed with 7.5 parts of azodiisobutybonitrile and 1,000 parts of isopropanol and the mixture is heated at 80°C. 15 minutes after the commencement of polymerization the remainder of the mixture is steadily added to the reaction mixture over 1 hour at from 80° to 85°C. Polymerization is continued to completion over 3 hours at this temperature, after which the reaction mixture is cooled to room temperature and the polymer solution is diluted with 500 parts of chloroform to give a 36.8 percent w/w polymer solution. A 1 percent w/w solution in chloroform gives a K value of 44 for said polymer.

Preparation of microcapsule dispersion 60 parts of the resulting solution of wall material are dissolved, together with 67 parts of 1-methyl-3-phenylindan, in 180 parts of chloroform containing 0.5 part of tributylamine, 1 part of N-benzoylleuco Methylene Blue, 3 parts of 3,3-bis-(dimethylamino)-6-dimethylamino phthalide (Crystal Violet lactone) and 6 parts of isopropanol with stirring to form a homogeneous solution.

In a vessel having a capacity of 800 parts and equipped with an Ultraturrax T 45 (by Jahnke and Kunkel) adapted to dip into the liquid, there are placed 200 parts of water and 50 parts of a 10% solution of a polyvinyl pyrrolidone having a K value of 90 and stirring is effected at a speed of 10,000 r.p.m. The above solution is then added over about 5 minutes. Stirring is continued until the average particle size is from 10 to 12 μ. The temperature rises to about 45°C. In this way there is obtained an emulsion which is stable for a prolonged period.

250 parts of water are placed in a stirred vessel having a capacity of 2,000 parts and equipped with a flat-paddle agitator (120 r.p.m.) and fitted with a descending condenser, and the above emulsion is added with stirring. From the thus diluted emulsion the chloroform is distilled off over about 75 minutes. To the dispersion, which is heated at 80° C, there are added 7 parts of 40 percent formaldehyde solution for hardening purposes, and the mixture is maintained at 70°C for about 1 hour.

On cooling there is obtained a stable microcapsule dispersion in a yield of more than 98 percent based on the wall material used, the microcapsules having an average diameter of from 5 to 8 μ. The microcapsules may be readily obtained as a free-flowing powder by filtration, repeated washing with water to remove the protective colloid and drying. The simplest method of drying is to spray the microcapsules through nozzles.

Tests on the microcapsules for leakage

The resulting microcapsule dispersion is brushed with a fine hair-brush onto paper weighing 5.7 g/m$^2$ which has been stretched taut in a frame in a moist condition and then dried. The dispersion on the paper is then dried at room temperature. The coating consists of 5.6 g/m$^2$ of microcapsules. The papers are odorless. A portion of the papers is stored at room temperature, a portion at 80°C and a further portion at 95°C, storage being for 16 hours in all cases.

After storage, the papers thus coated are each placed with the coated side against a paper the surface of which is coated in the usual manner with an acid bentonite acting as acid-reacting layer for the dye. The sheets of paper are then placed in an electric typewriter and are typed on with the pressure lever at setting "2".

The recording properties of the coating are then assessed according to the following scale:

grade 5: intensely blue, very sharply defined characters, very legible
grade 4: strongly blue, very legible
grade 3: blue, legible
grade 2: bluish, just legible
grade 1: no coloration, no copy, illegible.

The coated paper stored at room temperature immediately gives a blue copy (grade 5). The papers stored at 80° and 95°C also immediately give copies of the same intensity (grade 5). This test shows that the microcapsule wall is so well sealed that the copying properties of the paper remain unchanged despite storage under hot conditions, which means that these microcapsules may be used for making copying papers capable of storage at room temperature for prolonged periods.

COMPARATIVE EXAMPLE 1*a*

Manufacture of the microcapsules is carried out as described in Example 1 except that instead of 67 parts of 1-methyl-3-phenylindan 90 parts of dichlorodiphenyl and 10 parts of naphtha (boiling range 155° to 180°C) are used. The wall material consists of 400 parts of butanediol monoacrylate acetyl acetate, 395 parts of methyl methacrylate, 200 parts of acrylamide and 2 parts of the sodium salt of 2-sulfoethyl methacrylate. The amount of chloroform is 180 parts and the isopropanol is omitted.

There is obtained, at a yield of over 97%, a dispersion which settles very quickly to give a solid sediment containing microcapsules having an average diameter of from 7 to 10 μ.

A similarly prepared paper having a capsule coating of from 7–8 g/m$^2$ gives a copy of grade 5 intensity when tested in a typewriter as described above, this being true of the sample stored at room temperature and also of those stored at 85°C and 95°C.

When some of the paper is removed from a large stack of said paper, the smell of dichlorodiphenyl is distinctly noticeable.

EXAMPLE 1*b*

The microcapsules are manufactured as described in Example 1 except that commercially pure methylphenylindan as produced in the dimerization of styrene is used.

There is produced, at a yield of more than 98 percent, a stable dispersion containing capsules having a diameter of from 6 to 7 μ.

A paper coated in the same way with 6 g/m$^2$ of microcapsules provides a blue copy of intensity grade 5 when tested in a typewriter after storage at room temperature. Papers stored at 80° and 95°C produce grade 4 copies.

EXAMPLE 2

Using a copolymeric wall material produced as described in Example 1, a core material consisting of 34 parts of 1-methyl-3-phenyl-5-isopropylindan as produced in the commercial synthesis of styrene as a by-product, and 33 parts of an aromatics-containing hydrocarbon mixture (Shellsol N), 3 parts of Crystal Violet lactone, 1 part of N-benzoylleuco Methylene Blue and 180 parts of chloroform as volatile solvent is encapsulated in the manner described in Example 1. There is obtained, at a yield of more than 98 percent, a dispersion having microcapsules of an average diameter of from 4 to 6 μ.

Papers are prepared with these microcapsules in the manner described in Example 1 and then tested for copying properties after storage at various temperature. Papers stored at room temperatures give a grade 5 copy and papers stored for 16 hours at 80° and 95°C also give grade 5 copies. The characters are very legible in all cases.

EXAMPLE 3

In a repetition of Example 1, 37 parts of 1-methyl-3-[isopropylphenyl]-5-isopropylindan and 30 parts of n-dodecylbenzene are used as solvent in place of pure 1-methyl-3-phenylindan. There is obtained, in a yield of nearly 98 percent, a microcapsule dispersion having an average microcapsule diameter of from 6 to 8 μ. Paper prepared therewith and stored at room temperature gives a grade 4 copy. Papers stored at 80° and 95°C also give grade 4 copies.

For the following tests, a copolymer of 47.5 parts of butanediol monoacrylate acetyl acetate, 38 parts of methyl methacrylate, 14 parts of acrylamide and 0.25 part of 2-sulfoethyl methacrylate is prepared. The K value of this copolymer is 40.3, as measured in 1% chloroform solution by the method proposed by Fikentscher.

EXAMPLE 4

In a repetition of Example 1, 67 parts of 1-methyl-3-phenyl-5-isopropylindan are used as solvent for the dye precursor in place of methylphenylindan. This solvent is a reaction product of styrene and p-isopropylstyrene.

The solution is prepared by adding 180 parts of chloroform and there is produced, at a yield of more than 98 percent, a stable dispersion containing microcapsules having an average diameter of 7 μ.

Paper coated with the resulting microcapsules is completely ordorless, even when stored in a stack for a long period. When stored at room temperature, these papers give grade 5 copies. The grading of the copies is not changed when the papers are stored for 16 hours at 80° and 95°C.

EXAMPLE 5

Using the copolymeric wall material stated in Example 4, a core liquid consisting of 37 parts of 1-methyl-3-[p-isopropylphenyl]-5-isopropylindan, 30 parts of methylphenyl-[2,5-dimethylphenyl]-methane, 3 parts of Crystal Violet lactone, 1 part of N-benzoylleuco Methylene Blue and 180 parts of chloroform containing 0.5 part of tributylamine is encapsulated. There is obtained a stable dispersion having an average microcapsule diameter of from 4 to 5 μ. Papers stored at room temperature, 80° and 95°C (16 hours in each case) all give grade 4 copies.

EXAMPLE 6

Example 5 is repeated except that in place of the methylphenyl-[2,5-dimethylphenyl]-methane 27 parts of methylphenyl-[2,5-diisopropylphenyl]-methane and 40 parts of 1-methyl-3-phenylindan are used as solvent or liquid developer. The resulting dispersion contains microcapsules having an average diameter of from 6 to 7 μ, which after application to paper give excellent grade 5 copies after storage (for 16 hours) at room temperature or at 80° or at 95°C.

EXAMPLE 7

In a beaker having a capacity of 800 parts there is prepared a solution of 19 parts of gelatin in 90 parts of water at a pH of 5.5 and at a temperature of 55°C. Thorough stirring is effected with a high-speed stirrer equipped with a disc and a solution of 2.4 parts of Crystal Violet lactone and 0.8 part of N-benzoylleuco Methylene Blue in 30 parts of 1-methyl-3-phenylindan is emulsified in the above solution at 55°C until a droplet size of from 6 to 9 μ is obtained. There is then added, over 5 minutes, a solution of 19 parts of gum arabic in 80 parts of water at 55°C (pH 4.7).

The dispersion is transferred to a beaker having a capacity of 1,000 parts and is stirred during adjustment to pH 5.40 with 0.2N NaOH. Maintaining the temperature at 55°C, 300 parts of water having the same temperature are added over 20 minutes and the emulsion is adjusted to pH 4.5 over about 15 minutes with 0.1N acetic acid and then stirred for a further 20 minutes. After the dropwise addition of 3.6 parts of 37 percent formaldehyde solution, the mixture is cooleld to 5°C over 50 minutes and then slowly adjusted to pH 9.5 with 0.2N NaOH. After 6 hours the capsule walls are hardened. There is obtained an approximately 19% dispersion which shows no tendency to settle. The microcapsules have a diameter of approximately 6 to 8 μ.

Paper coated with this dispersion provides grade 5 copies when tested under the conditions given above and after storage for 16 hours at room temperature or at 80° or at 95°C.

We claim:

1. Dye containing microcapsules which comprise:

a. a capsule wall, said wall being a mixture of gelatine and gum arabic or a copolymer of from 20 to 65 percent by weight of methyl methacrylate, from 10 to 65 percent by weight of an acetyl acetate of mono(meth)-acrylates of aliphatic diols of from 2 to 8 carbon atoms, from 0 to 30 percent by weight of acrylamide, from 0 to 30 percent by weight of acrylic acid, methacrylic acid or a mixture thereof, from 0 to 30 percent by weight of vinyl pyrrolidone, from 0 to 3 percent by weight of vinylsulfonic acid or salts thereof, of 2-sulfoethyl methacrylate or salts thereof or of 2-acrylamido-2-methylpropane-sulfonic acid or salts thereof; and, b. core material consisting essentially of at least one dye and a water immiscible organic liquid consisting essentially of at least one phenylindane mono- or disubstituted by linear or branched alkyl of from 1 to 6 carbon atoms.

2. Microcapsules as claimed in claim 1, wherein the water immiscible organic liquid contains at least one additional solvent selected from the group consisting of high-boiling aliphatic hydrocarbons, diphenylbenzene, diphenyls, terphenyls, phthalates, indans, tetralines, monoalkylbenzenes and polyalkylbenzenes.

3. Microcapsules as claimed in claim 1, wherein the water-immiscible organic liquid consists essentially of 1-methyl-3-phenylindan, 1-methyl-3-phenyl-5-isopropylindan, 1-methyl-3-phenyl-5-t-butylindan, 1-methyl-3-[p-isopropylphenyl]-5-isopropyl-indan, 1-ethyl-2-methyl-3-phenylindan, x-$\alpha$-phenylethylindan (where *x*may be 1, 2, x may be 1,2, 4 or 5), 1-ethyl-2-phenyl-3-methylindan, x-phenylindan (where *x* may be 1, 2, 4 or 5), 1,5-dimethyl-3-[p-tolyl]-indan, 1,1,3-trimethyl-3-phenylindan, 1-phenyl-2-methylindan, 1-p-tolylindan, 1-methyl-2-phenylindan or a mixture thereof.

4. Microcapsules of which the core material is at least one dye and a water immiscible organic liquid consisting essentially of at least one 3-phenylindane mono- or disubstituted by linear or branched alkyl of from 1 to 6 carbon atoms; and the wall material is a mixture of gelatine and gum arabic or a copolymer of from 20 to 65 percent by weight of methyl methacrylate, from 10 to 65 percent by weight of an acetyl acetate of mono(-meth)-acrylates of aliphatic diols of from 2 to 8 carbon atoms, from 0 to 30 percent by weight of acrylamide, from 0 to 30 percent by weight of acrylic acid, methacrylic acid or a mixture thereof, from 0 to 30 percent by weight of vinyl pyrrolidone, from 0 to 3 percent by weight of vinylsulfonic acid or salts thereof, of 2-sulfoethyl methacrylate or salts thereof or of 2-acrylamido-2-methylpropane-sulfonic acid or salts thereof.

5. Microcapsules as claimed in claim 4, wherein the water immiscible organic liquid contains at least one additional solvent selected from the group consisting of high-boiling aliphatic hydrocarbons, diphenylbenzene, diphenyls, terphenyls, phthalates, indans, tetralines, monoalkylbenzenes and polyalkylbenzenes.

6. Microcapsules as claimed in claim 4, wherein the water immiscible organic liquid consists essentially of 1-methyl-3-phenylindan, 1-methyl-3-phenyl-5-isopropyl indan, 1-methyl-3-[isopropylphenyl]-5-isopropyl indan or a mixture therefrom.

* * * * *